United States Patent [19]
Ban et al.

[11] Patent Number: 5,477,688
[45] Date of Patent: Dec. 26, 1995

[54] AUTOMOTIVE AIR CONDITIONING APPARATUS

[75] Inventors: Takashi Ban; Kunifumi Goto; Hidefumi Mori, all of Kariya, Japan

[73] Assignee: Kabushiki Kaisha Toyoda Jidoshokki Seisakusho, Kariya, Japan

[21] Appl. No.: 395,293

[22] Filed: Feb. 24, 1995

Related U.S. Application Data

[63] Continuation of Ser. No. 142,711, Oct. 25, 1993.

[30] Foreign Application Priority Data

Oct. 27, 1992 [JP] Japan ................................. 4-288875

[51] Int. Cl.$^6$ ........................... F25B 9/00; B60H 1/32
[52] U.S. Cl. ............................. 62/6; 62/239; 62/244
[58] Field of Search .......................... 62/6, 239, 244

[56] References Cited

U.S. PATENT DOCUMENTS

| | | | |
|---|---|---|---|
| 4,123,916 | 11/1978 | Kreger | 62/6 X |
| 4,566,531 | 1/1986 | Stoltz | 62/244 X |
| 4,843,826 | 7/1989 | Malaker | 62/6 |
| 4,996,841 | 3/1991 | Meijer et al. | 62/6 X |
| 5,094,083 | 3/1992 | Horn et al. | 62/6 |

FOREIGN PATENT DOCUMENTS

| | | |
|---|---|---|
| 4132939 | 4/1993 | Germany . |
| 2208459 | 8/1990 | Japan . |
| 2177497 | 1/1987 | United Kingdom . |

*Primary Examiner*—Christopher Kilner
*Attorney, Agent, or Firm*—Brooks Haidt Haffner & Delahunty

[57] ABSTRACT

An automotive air conditioning apparatus includes a Stirling refrigerator. In this refrigerator, many fins absorb heat from air in a passenger room, and a water jacket is connected to the cooling circuit of the vehicle engine by way of a pipe. Since an operating gas absorbs heat at the time of isothermal expansion, fins cool the passenger room without using Freon. So, a condenser is not required. Although the operating gas is heated at the time of isothermal compression, the water jacket radiates heat to circulating water of the vehicle engine. So, an individual, i.e., radiator is not required.

5 Claims, 2 Drawing Sheets

AUTOMOTIVE AIR CONDITIONING APPARATUS

This application is a continuation of application Ser. No. 08/142,711, filed Oct. 25, 1993.

BACKGROUND OF THE INVENTION

1. Field of the Invention

The present invention relates to an automotive air conditioning apparatus, especially, an automotive air conditioning apparatus for cooling a passenger room by use of a Stirling refrigerator.

2. Description of the Related Art

A Stirling refrigerator is operated to repeat an isothermal compression, an isochoric cooling, an isothermal expansion and an isochoric heating of an operating gas such as air and helium gas. The operating gas absorbs heat at the time of the isothermal expansion, and the operating gas is heated at the time of the isothermal compression. This is disclosed in REITO Vol. 63, No. 733.

It is known that the above conventional Stirling refrigerator is installed into a domestic chilling unit. This is disclosed in Japanese Unexamined Patent Publication No. 208459/1990.

When the Stirling refrigerator is used for cooling the passenger room, it requires another radiator in addition to a radiator for cooling the vehicle engine since a refrigerant circulated in a radiating portion requires an individual radiator. Thus, it is difficult to lighten the vehicle weight.

SUMMARY OF THE INVENTION

An object of the present invention is to provide an automotive air conditioning apparatus which maintains a suitable condition and achieves light weight in case of cooling a passenger room.

To solve the above problem, the automotive air conditioning apparatus of the present invention comprises a Stirling refrigerator which is operated by a vehicle engine, and repeats an isothermal compression, an isochoric cooling, an isothermal expansion and an isochoric heating of an operating gas, and has an endothermic portion for supplying heat to said operating gas and a radiating portion for radiating heat from said operating gas. The endothermic portion is constructed to absorb heat from the passenger room of a vehicle, and the radiating portion is connected to a cooling circuit of the vehicle engine.

In the automotive air conditioning apparatus according to the present invention, it is preferable that the endothermic portion is directly disposed in an air passage for cooling the passenger room.

The operating gas absorbs heat at the time of the isothermal expansion, and the endothermic portion absorbs heat from the passenger room. Thus, it is possible to cool the passenger room without using a conventional Freon (chlorofluorocarbon). As a result, a conventional condenser for condensing Freon in a vehicle is not required.

The operating gas is heated at the time of the isothermal compression, and the radiating portion radiates heat. The radiating portion is connected to a cooling circuit of a vehicle engine, and it radiates heat to circulating water circulated in the cooling circuit. Therefore, an individual, i.e., separate, radiator is not required for the radiating portion, and this contributes light weight.

In the automotive air conditioning apparatus of the present invention, when the endothermic portion is directly disposed in the air passage for cooling the passenger room, it absorbs heat directly from the air in the passenger room. Therefore, a conventional chilling unit is not required in the passenger room, and an individual refrigerant is not required for circulating in the cooler unit and the endothermic portion.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiment which is provided herein for purposes of illustration only and is not intended to limit the scope of the appended claims.

First Preferred Embodiment

Figure 1:
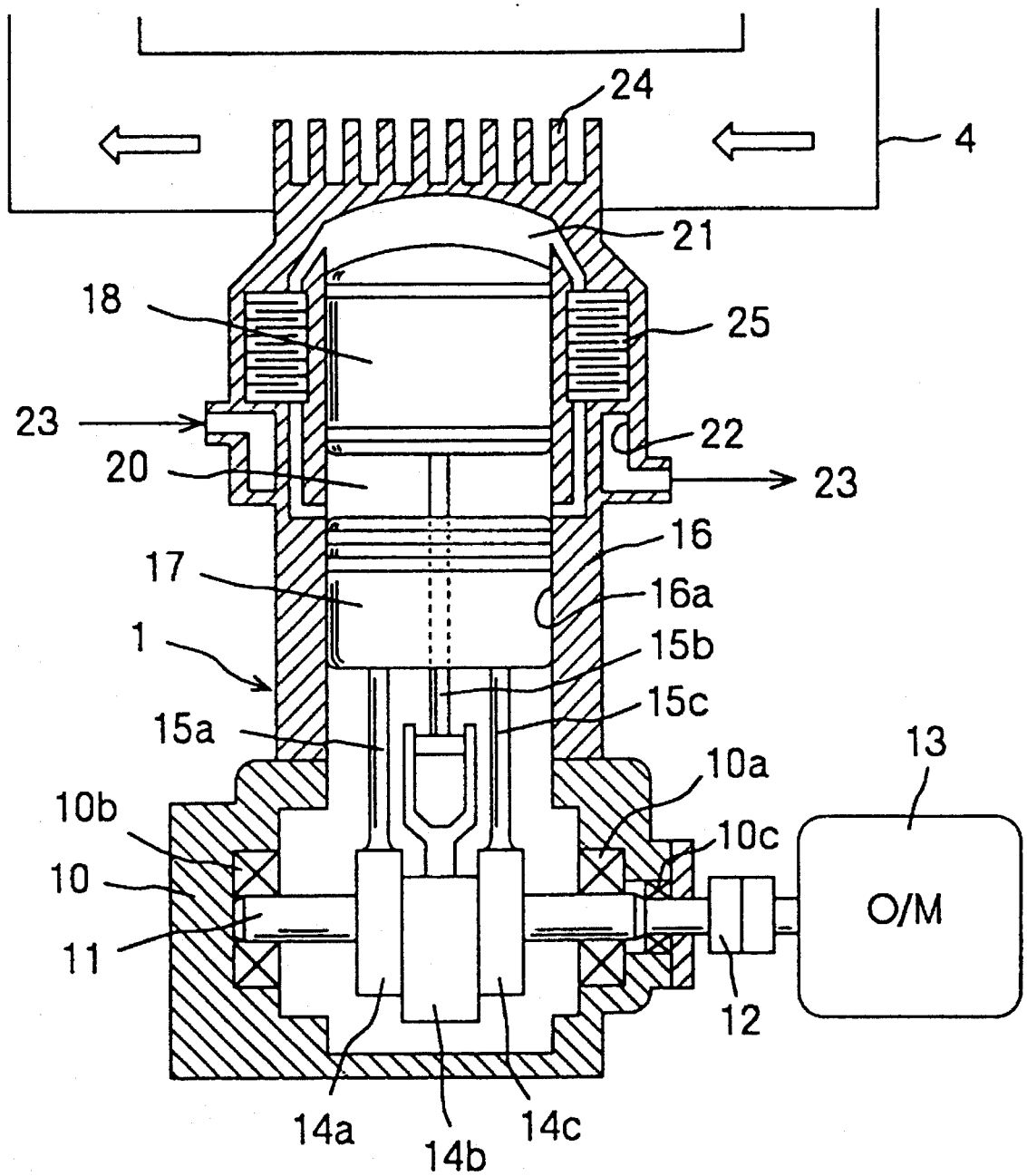
FIG. 1 is a partially cross-sectionad view for showing the structure of an automotive air conditioning apparatus according to the First Preferred Embodiment.
Figure 2:
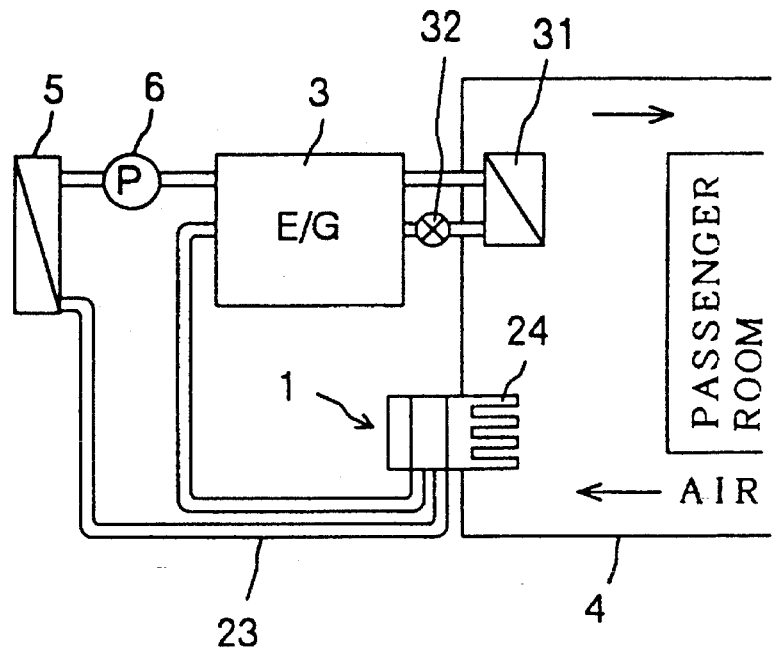
FIG. 2 is a diagrammatic view for showing the structure of an automotive air conditioning apparatus according to a First Preferred Embodiment.

An automotive air conditioning apparatus, as shown in FIG. 1, comprises a cylindrical Stirling refrigerator 1. In the Stirling refrigerator 1, an input shaft 11 is supported between bearings 10a and 10b in a crank case 10. One end of the bearing 10a of the input shaft 11 is extended to an outside of the crank case 10 by way of a shaft seal apparatus 10c, and it is connected to a hydraulic motor 13 by way of a coupling 12. The hydraulic motor 13 is connected to a hydraulic pump (not shown) which is actuated by a vehicle engine 3 (as shown in FIG. 2).

In the crank case 10, cams 14a, 14b and 14c are fixed to the input shaft 11. The cam 14b has a predetermined phase difference with regard to cams 14a and 14c. Each rod 15a, 15b and 15c is rotatably connected to the cam 14a, 14b and 14c. A cylinder block 16 having a single cylinder bore 16a is connected to the crank case 10. A power piston 17 and a displacer 18 are slidably installed in the cylinder bore 16a. The power piston 17 is rockably connected to the rods 15a and 15c. The displacer 18 is rockably connected to the rod 15b which is rockable in the power piston 17. A compression chamber 20 exists between the power piston 17 and the displacer 18 in the cylinder bore 16a. An expansion room 21 exists between the displacer 18 and the bore head.

A water jacket 22 as a radiating portion is formed around the compression chamber 20 in the cylinder block 16. The water jacket 22, as shown in FIG. 2, is connected to a water jacket of a vehicle engine 3 by way of a pipe 23. The other end of the pipe 23 is again connected to the water jacket of the vehicle engine 3 by way of a radiator 5 and a pump 6.

The water jacket of the engine 3 is connected to a heater 31. A valve 32 is used to control the circulating current.

As shown in FIG. 1, many fins 24 as the endothermic portion are projected at the side of the expansion chamber room 21 of the cylinder block 16. These fins 24 are directly disposed in an air passage 4 for cooling the passenger room.

A regenerator 25 for connecting the compression chamber 20 and the expansion chamber room 21 is installed in the cylinder block 16. Air as an operating gas fills the compression chamber 20, the expansion chamber 21, the regenerator 25 and its passages.

In the above-constructed automotive air conditioning apparatus, the driving force of the vehicle engine 3 is transmitted to the hydraulic motor 13 by way of the hydraulic pump. Then, the input shaft 11 is driven by the hydraulic motor 13, and the power piston 17 and the displacer 18 are driven by cams 14a to 14c.

When the displacer 1 8 is around the top dead point and the power piston 17 moves from the bottom dead point to the top dead point, air in the compression chamber 20 is isothermally compressed heating the water jacket 22 because of radiating heat. The water jacket 22 is connected to a cooling circuit of the vehicle engine 3 and it radiates heat to circulating water circulated in the cooling circuit including the radiator 5. As a result, an individual or separate radiator is not required. Therefore, the automotive air conditioning apparatus of the present invention achieves light weight. Furthermore, only the pipe 23 for circulating water to the water jacket 22 is required for exchanging heat. Therefore, it is possible to easily connect parts, and an engine compartment has free space.

When the displacer 18 moves from the top dead point to the bottom dead point and the power piston 17 is around the top dead point, air in the compression chamber 20 is transmitted to the regenerator 25. Then, the transmitted air is isochorically cooled while radiating heat to the regenerator 25 and it is transmitted to the expansion chamber 21.

When the displacer 18 is around the bottom dead point and the power piston 17 moves from the top dead point to the bottom dead point, air in the expansion chamber 21 is isothermally compressed to cool the fins 24 by of absorbing heat. At this time, if a passenger desires to cool the passenger room, the valve 32 is shut in order not to circulate high-temperature circulated water from the vehicle engine 3 to the heater Since the fins 24 are directly disposed in the air passage for cooling the passenger room, they directly absorbs heat from air in the passenger room circulated by a blower (not shown). Therefore, in the automotive air conditioning apparatus of the present invention, it is possible to cool the passenger room without using Freon, and to maintain a suitable condition. As a result, a conventional condenser for condensing Freon in a vehicle is not required, and light weight of a vehicle can be achieved because a conventional cooler unit is not needed in a vehicle. Furthermore, other refrigerant circulated in the cooler unit and the fins 24 are not required so that heat loss is less and an ability for cooling the passenger room is improved.

When the displacer 18 moves from the bottom dead point to the top dead point and the power piston 17 is around the bottom dead point, air in the expansion chamber 21 is transmitted to the regenerator 25. Then, the transmitted air is isochorically heated while absorbing heat from the regenerator 25 and it is transmitted to the compression chamber 20. Thus, an isothermal compression, an isochoric cooling, an isothermal expansion and an isochoric heating of air are repeated.

If a passenger desires to warm a passenger room, the hydraulic motor 13 is stopped and the valve 32 is opened . Therefore, high-temperature circulating water is circulated from the vehicle engine 3 to the heater 31. A blower (not shown) circulates heated air in the passenger room.

Second Preferred Embodiment

Figure 3:
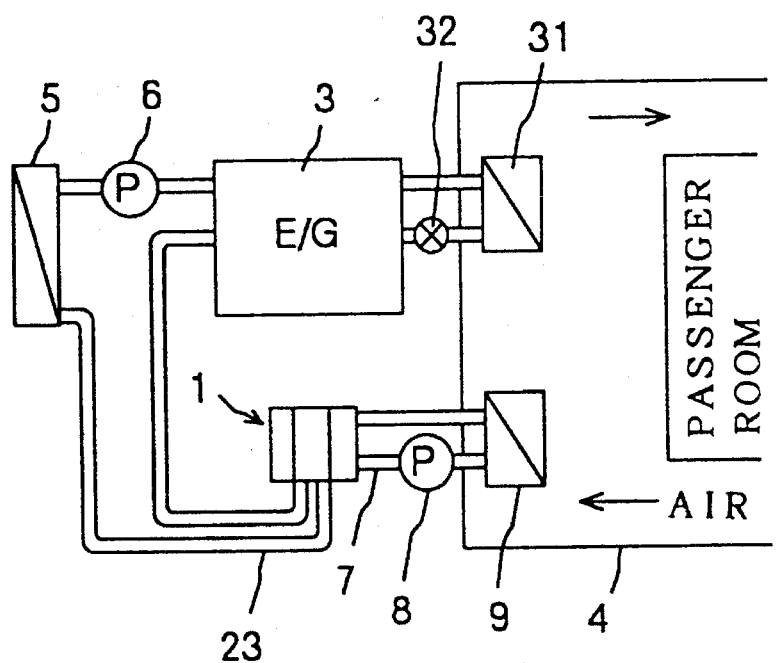
FIG. 3 is a whole view for showing the structure of an automotive air conditioning apparatus according to the Second Preferred Embodiment.

An automotive air conditioning apparatus, as shown in FIG. 3, comprises a cylindrical Stirling refrigerator 1 having the same jacket as the water jacket 22 in the First Preferred Embodiment. The jacket is connected to a cooler unit 9 in the passenger room by a pipe 7 via a pump 8. Therefore, an individual, i.e., separate, refrigerant is circulated. Since other structures are the same as those of the First Preferred Embodiment, same numbers are used and a detail description is omitted.

In the automotive air conditioning apparatus, the cooler unit 9 and the individual refrigerant circulated in the jacket are required. But, a desired cooling can be achieved and no Freon is used so that a suitable condition can be maintained. Furthermore, since a condenser is not required, light weight of a vehicle can be achieved.

In the automotive air conditioning apparatus of the First and Second Preferred Embodiments, cooling and heating can be freely selected. Moreover, when the hydraulic motor 13 is driven and the valve 32 is opened at the same time, dehumidification in the passenger room can be achieved.

In the automotive air conditioning apparatus of the present invention, when an endothermic portion is directly disposed in an air passage for cooling a passenger room, a cooler unit is not required so that light weight of a vehicle can be achieved. Furthermore, since an individual refrigerant is not required, heat loss is less and an ability for cooling the passenger room is improved. Moreover, only the pipe for circulating cooling water of the vehicle engine to a radiating portion is required for exchanging heat. Therefore, it is possible to easily connect parts, and an engine room has free space.

Having now fully described the present invention, it will be apparent to one of ordinary skill in the art that many changes and modifications can be made thereto without departing from the spirit or scope of the present invention as set forth herein including the appended claims.

What is claimed is:

1. An automotive air conditioning apparatus for a passenger compartment in a motor vehicle, said vehicle having a vehicle engine including an engine cooling circuit for conducting engine cooling fluid within said engine, a vehicle engine radiator, and a fluid conduit connection including pump means between said vehicle engine cooling circuit and said radiator; said air conditioning apparatus comprising a heater for containing said engine cooling for adding heat to said passenger compartment; fluid conduit connections between said heater and said engine cooling circuit including value means therein; a Stirling refrigerator for containing operating fluid and for operation by said vehicle engine to repeatedly cycle said operating fluid through isothermal compression, isochoric cooling, isothermal expansion, and isochoric heating and thereby cool said passenger compartment, said Stirling refrigerator having an endothermic portion for supplying heat to said operating fluid and a radiating portion for radiating heat from said operating fluid; a fluid conduit for conducting said engine cooling fluid from said radiator to said radiating portion of said Stirling refrigerator; and a fluid conduit for conducting said engine cooling fluid from said radiating portion of said Stirling refrigerator to said engine cooling circuit.

2. An automotive air conditioning apparatus according to claim 1, wherein said passenger compartment has an air conditioning passage therewithin, and said Stirling refrigerator endothermic portion is constructed for disposition directly within said air conditioning passage.

3. An automotive air conditioning apparatus according to claim 2, wherein said heater is constructed for disposition directly within said air conditioning passage.

4. An automotive air conditioning apparatus according to claim 1, which further comprises a cooling unit for disposition within, and for containing refrigerant fluid for directly cooling said passenger compartment, and fluid conduit connections including pump means for conducting said refrigerant fluid between said cooling unit and said Stirling refrigerator.

5. An automotive air conditioning apparatus according to claim 4, wherein said passenger compartment has an air conditioning passage therewithin, and said cooling unit and said heater are each constructed for disposition directly within said air conditioning passage.

\* \* \* \* \*

UNITED STATES PATENT AND TRADEMARK OFFICE
CERTIFICATE OF CORRECTION

PATENT NO. : 5,477,688
DATED : December 26, 1995
INVENTOR(S) : T. Ban et al

It is certified that error appears in the above-indentified patent and that said Letters Patent is hereby corrected as shown below:

Column 2, line 18, "cross-sectionad" should read
--cross-sectioned--; line 24, delete "whole", insert
--diagrammatic--;  ; line 25, delete "the" insert --a--.

Column 3, line 8, delete "room"; line 46, after "heater"
insert --31.--; line 48, "absorbs" should read --absorb--.

Column 4, line 54, after "cooling" insert --fluid--;
line 57, "value" should read --valve--.

Signed and Sealed this

Thirtieth Day of April, 1996

Attest:

BRUCE LEHMAN

*Attesting Officer*    *Commissioner of Patents and Trademarks*